(12) United States Patent
Squires

(10) Patent No.: US 10,898,006 B2
(45) Date of Patent: Jan. 26, 2021

(54) COT AND CORNER CONNECTOR THEREFOR

(71) Applicant: The Pet Cot Company, O'Fallon, MO (US)

(72) Inventor: Gregory A. Squires, St. Peters, MO (US)

(73) Assignee: The Pet Cot Company, O'Fallon, MO (US)

( * ) Notice: Subject to any disclaimer, the term of this patent is extended or adjusted under 35 U.S.C. 154(b) by 210 days.

(21) Appl. No.: 16/051,100

(22) Filed: Jul. 31, 2018

(65) Prior Publication Data

US 2019/0038036 A1 Feb. 7, 2019

Related U.S. Application Data

(60) Provisional application No. 62/540,662, filed on Aug. 3, 2017.

(51) Int. Cl.
| | |
|---|---|
| *A47C 17/66* | (2006.01) |
| *A47C 31/02* | (2006.01) |
| *F16B 12/44* | (2006.01) |
| *A01K 1/035* | (2006.01) |
| *A47C 17/64* | (2006.01) |

(52) U.S. Cl.
CPC .............. *A47C 17/66* (2013.01); *A01K 1/035* (2013.01); *A01K 1/0353* (2013.01); *A47C 17/645* (2013.01); *A47C 31/02* (2013.01); *A47C 31/023* (2013.01); *F16B 12/44* (2013.01); *F16B 2012/446* (2013.01)

(58) Field of Classification Search
CPC ....... A47C 17/64; A47C 17/645; A47C 17/66; A47C 31/02; A47C 31/023; A01K 1/035; A01K 1/0353; F16B 12/44; F16B 12/446
See application file for complete search history.

(56) References Cited

U.S. PATENT DOCUMENTS

| | | | | |
|---|---|---|---|---|
| 1,820,283 | A | * | 8/1931 | Mills ..................... A01K 1/0353 5/114 |
| 1,820,284 | A | * | 8/1931 | Mills ..................... A01K 1/0353 119/28.5 |
| 2,871,489 | A | * | 2/1959 | Emmert .................. A47C 17/70 5/114 |
| 4,516,305 | A | * | 5/1985 | Unger ................... A47C 31/023 29/448 |
| 4,958,390 | A | * | 9/1990 | Mendenhall ......... A47C 19/005 5/110 |

(Continued)

*Primary Examiner* — David R Hare
(74) *Attorney, Agent, or Firm* — Stinson LLP

(57) ABSTRACT

A corner connector supports frame members that are securable to side margins of a support sheet to form a cot. The corner connector can be assembled from two parts, a base member and a cap. The base member can be configured to receive end portions of the frame members in an open-top channel. This can allow a subassembly of the support sheet and the frame members to be lowered into the corner connector base members when forming the cot. The base member and cap can include opposing portions configured to capture corner portions of the support sheet between them. The corner connector can include a shield member recess adjacent to a frame member recess to mount a shield member to extend alongside a frame member installed in the corner connector.

20 Claims, 7 Drawing Sheets

(56) References Cited

U.S. PATENT DOCUMENTS

| | | | | |
|---|---|---|---|---|
| 5,189,772 | A * | 3/1993 | Appelt | A47C 31/02 29/91.1 |
| 5,960,739 | A * | 10/1999 | Storm | A01K 1/0353 119/28.5 |
| 5,992,348 | A * | 11/1999 | Harding | A47C 23/26 119/28.5 |
| 6,209,486 | B1 * | 4/2001 | Reynolds | A01K 1/0353 119/161 |
| 6,345,400 | B2 * | 2/2002 | Elliott | A47C 17/645 5/110 |
| 6,450,119 | B1 * | 9/2002 | Holt, Jr. | A01K 1/0157 119/28.5 |
| 6,513,178 | B1 * | 2/2003 | Kelly | A47C 19/202 5/110 |
| 6,564,400 | B2 * | 5/2003 | Kelly | A47C 19/202 5/110 |
| 6,701,548 | B2 * | 3/2004 | Vigneron | A47C 19/202 5/110 |
| 7,086,100 | B1 * | 8/2006 | Lo | A47D 7/002 5/110 |
| 7,926,447 | B2 * | 4/2011 | Flannery | A01K 1/0353 119/28.5 |
| 8,695,306 | B2 * | 4/2014 | Cvek | A47C 31/023 52/660 |
| 8,919,284 | B2 * | 12/2014 | Wolfe, Jr. | A01K 15/02 119/28.5 |
| 10,154,735 | B2 * | 12/2018 | Poveda Rosa | A47C 17/66 |
| 2012/0318206 | A1 * | 12/2012 | van Leeuwen | A01K 1/0353 119/416 |
| 2019/0261598 | A1 * | 8/2019 | Moher | F16M 11/22 |

* cited by examiner

COT AND CORNER CONNECTOR THEREFOR

CROSS-REFERENCE TO RELATED APPLICATION

This application claims priority to U.S. Provisional Patent Application Ser. No. 62/540,662, entitled Cot and Corner connector Therefor, which was filed on Aug. 3, 2017, and is hereby incorporated by reference in its entirety.

FIELD

The present disclosure relates generally to a cot and a corner connector for a cot.

BACKGROUND

Cots support users such as humans and animals when, for example, they are at rest (e.g., seated, lying down, sleeping, etc.). In general, cots include a flexible support sheet that is held in tension on a frame. Frames can include corner connectors that interconnect an arrangement of perimeter side members. Some cots include frames that encapsulate edges of the support sheet to limit wear.

SUMMARY

In one aspect, a corner connector for use in a frame assembly of a cot comprises a base member having an attachment portion defining a top of the base member and a support portion defining a bottom of the base member spaced apart from the top of the base member along an axis. The attachment portion comprises a first frame member attachment section and a second frame member attachment section. The first frame member attachment section defines a first frame member channel for receiving an end portion of a side frame member of the frame assembly. The first frame member channel has an open top end extending through the top of the base member. The second frame member attachment section defines a second frame member channel for receiving an end portion of another side frame member of the frame assembly. The second frame member channel has an open top end extending through the top of the base member and extending transverse to the first frame member channel. A cap is securable to the base member to extend over the open top ends of the first and second frame member channels.

In another aspect, a corner connector for use in a frame assembly of a cot comprises a body comprising a first frame member attachment section and a second frame member attachment section. Each of the first and second frame member attachment sections defines a frame member recess configured to operatively receive a respective side frame member of the frame assembly and a shield member recess adjacent the frame member recess configured to operatively receive a respective shield member of the frame assembly. The frame member recess and the shield member recess of each of the first and second frame member attachment sections are shaped and arranged to mount the respective side frame member and the respective shield member on the corner connector so that the shield member extends alongside the side frame member immediately adjacent thereto when the frame member recess and the shield member recess operatively receive the respective side frame member and shield member.

In still another aspect, a corner connector for use in a frame assembly of a cot comprises a base member having an attachment portion defining a top of the base member and a support portion defining a bottom of the base member spaced apart from the top of the base member along an axis. The attachment portion is configured for attachment to first and second side frame members of the frame assembly whereby the corner connector mounts the first and second side frame members for extending from the corner connector in transverse directions. The base member further comprises a sheet attachment section. A cap is securable to the base member and includes an opposing sheet attachment portion configured to oppose the sheet attachment section of the base member for capturing a corner margin of a support sheet of the cot between the sheet attachment section and the cap.

In yet another aspect, a method of assembling a cot comprises assembling a subassembly comprising a plurality of side frame members secured to a plurality of side margins of a support sheet. The subassembly is installed as a unit into base members of a plurality of corner members by lowering first and second end portions of each of the side frame members into respective frame member channels formed in the base members. A cap is installed on each of the base members.

Other aspects and features will be apparent hereinafter.

BRIEF DESCRIPTION OF THE DRAWINGS

Corresponding reference characters indicate corresponding parts throughout the drawings.

DETAILED DESCRIPTION

Figure 1:
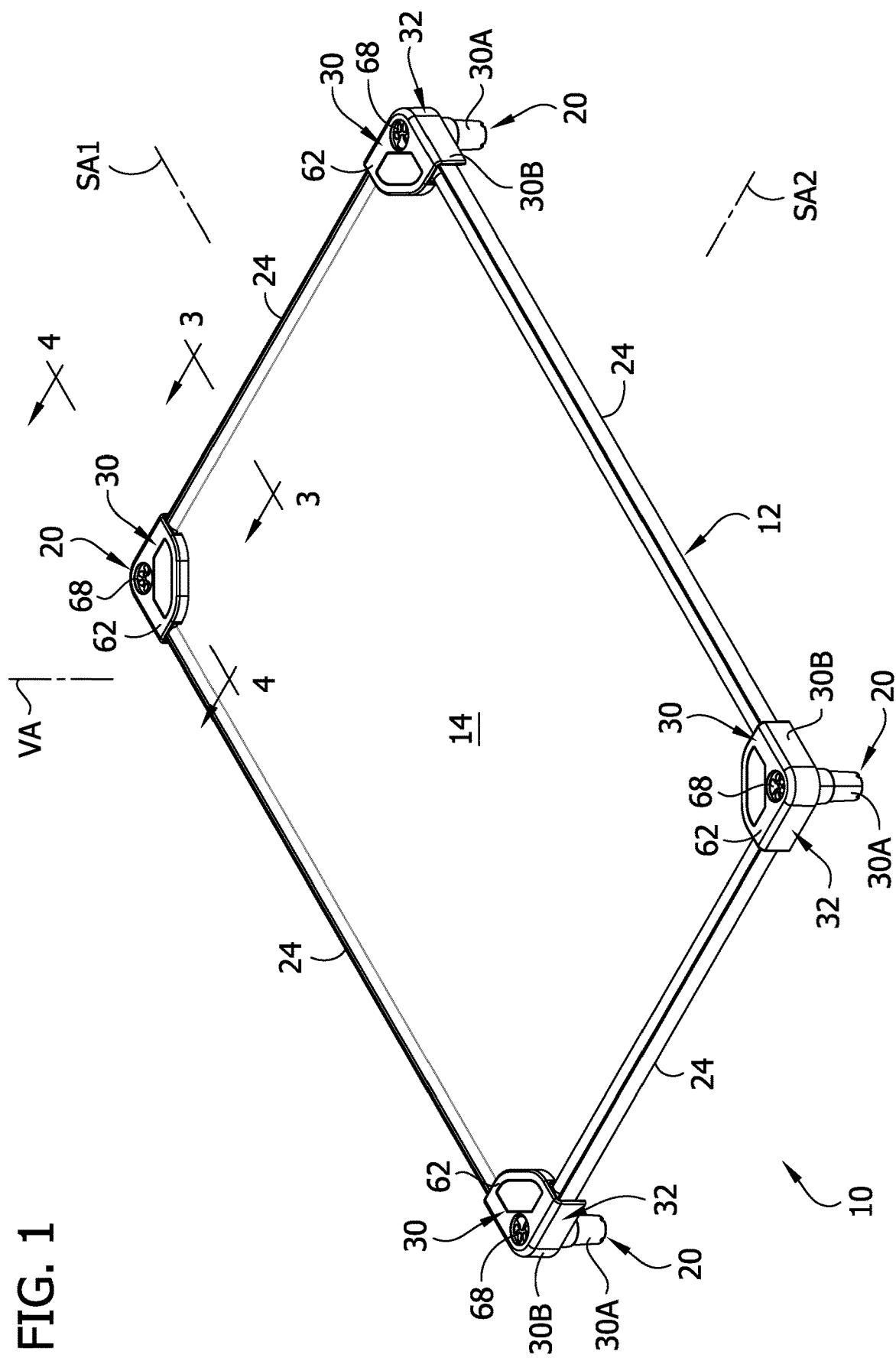
FIG. 1 is a perspective of a cot.
Figure 2:
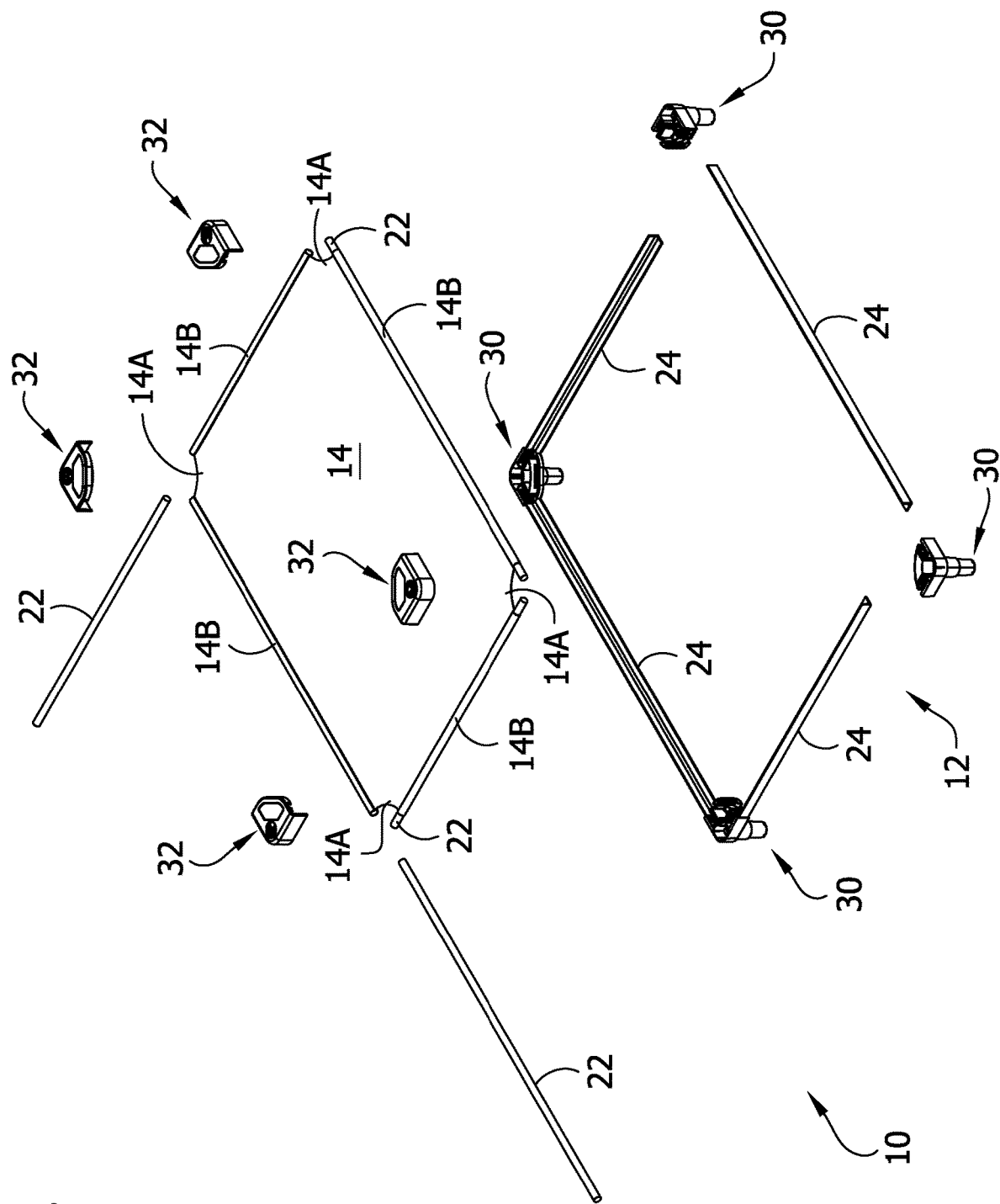
FIG. 2 is an exploded perspective of the cot.

Referring to FIGS. 1 and 2, a cot is generally indicated at reference number 10. The cot 10 comprises a frame assembly, generally indicated at 12, and a support sheet 14 stretched over the frame assembly. As explained below, the frame assembly 12 is configured to hold the support sheet 14 in tension so that the support sheet extends generally in a plane that is spaced apart above the underlying support surface of the cot 10 (e.g., the ground, another cot, etc.). Thus, the cot 10 is configured to support a user on the support sheet 14 at a height that is spaced apart above the underlying support surface of the cot. In certain embodiments, the cot 10 is configured for supporting an animal, such as a companion animal like a dog or cat. As will be explained in further detail below, the frame assembly 12 is configured to shield the edges of the support sheet 14 to limit damage caused by animals chewing or scratching the edges of the of the cot 10. The cot can also be configured for supporting a human user lying down or sitting on the cot.

Referring to FIG. 2, the frame assembly 12 includes a plurality of corner connectors, generally indicated at 20, and a plurality of side frame members 22 and side shield members 24 extending between the corner connectors.

Together, the frame members 22 and the shield members 24 form sides of the frame assembly extending along respective side axes SA1, SA2 (FIG. 1). As explained below, the corner connectors 20 are positioned at corners of the cot 10 and configured to interconnect the side frame members 22 and shield members 24 to form the frame assembly 12. In the illustrated embodiment, the frame assembly 12 is rectangular and includes four corner connectors 20 and four frame members 22 and shield members 24 forming two pairs of parallel frame assembly sides extending along perpendicular axes SA1, SA2. In other embodiments, the frame assembly could have other polygonal shapes (e.g., triangular, pentagonal, hexagonal, etc.) and/or have other numbers of corner connectors, frame members, and shield members. Though the frame members 22 and shield members 24 are substantially straight in the illustrated embodiment, in other embodiments the frame members and shield members could be curved or otherwise non-straight.

Figure 3:
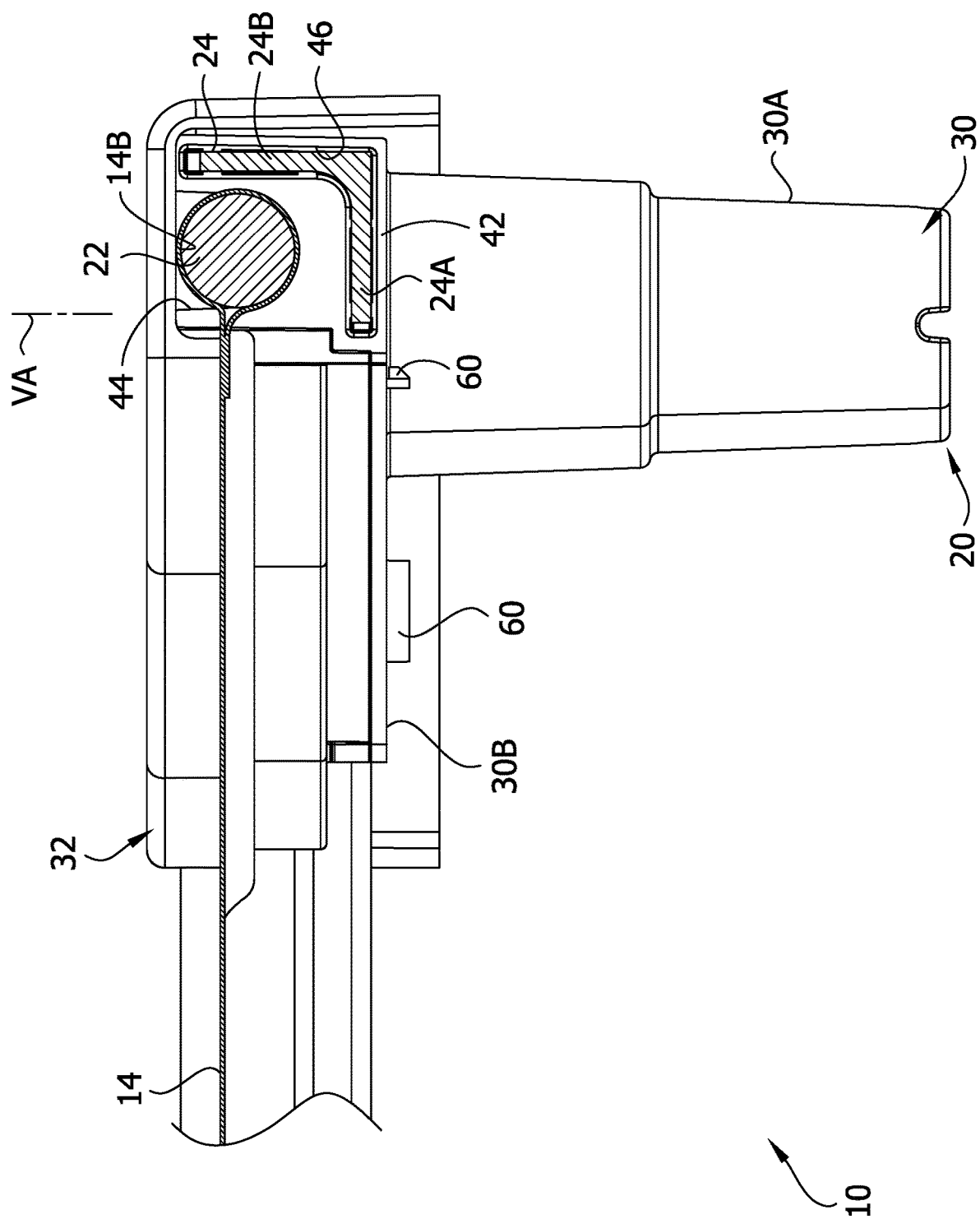
FIG. 3 is a fragmentary cross section taken in the plane of line 3-3 of FIG. 1.

The support sheet 14 can be formed of any suitable material for supporting a user lying on the cot 10. In general, the support sheet 14 is formed from a thin and flexible material (e.g., a woven or knit fabric, etc.) that is configured for being held in tension by the frame assembly 12. In one embodiment, the support sheet 14 is formed from a breathable fabric so that airflow underneath the cot 10 can provide cooling to a person or animal supported on the support sheet. Referring to FIG. 2, the support sheet 14 has a plurality of corner margins 14A (e.g., four corner margins in the illustrated embodiment) and a plurality of side margins 14B (e.g., four side margins in the illustrated embodiment) extending between the plurality of corner margins. Each of the side margins 14B defines at least one loop for receiving a side frame member 22 as shown in FIG. 3. End portions of each side frame member 22 protrude from the loops 14B for being received in the corner connectors 20 as described in further detail below. As shown in FIG. 2, the corner margins 22A are oriented transverse to the adjacent side margins 22B for being captured in the corner connectors 20 as described below. As further explained below, in the assembled cot 10, the shield members 24 and the corner members 20 shield the margins 14A, 14B of the support sheet 14 against wear. In this sense, the cot 10 is "chew proof" because animals, children, etc. are inhibited from chewing on the edges of the support sheet 14, which can break the connection between the support sheet and the frame assembly 12 and render the cot inoperable.

Each corner connector 20 includes a base member, generally indicated at 30, and a cap, generally indicated at 32. The illustrated cap 32 is a separate component from the base member 30 and is configured to be attached to the base member. The base member 30 comprises a lower leg portion 30A and an upper attachment portion 30B. In the illustrated embodiment, the leg portion 30A has a substantially cylindrical shape extending generally along a vertical axis VA (e.g., an axis generally perpendicular to the support plane of the cot 10). Each leg portion 30A forms a corner support leg of the cot 10 and defines a bottom end of the base member 30 configured for contact with the underlying support surface. Suitably, the leg portion 30A has a height that spaces the sides of the frame 12 above the support surface by a sufficient distance so that the support sheet 14 does not contact the support surface when supporting the user.

Figure 5:
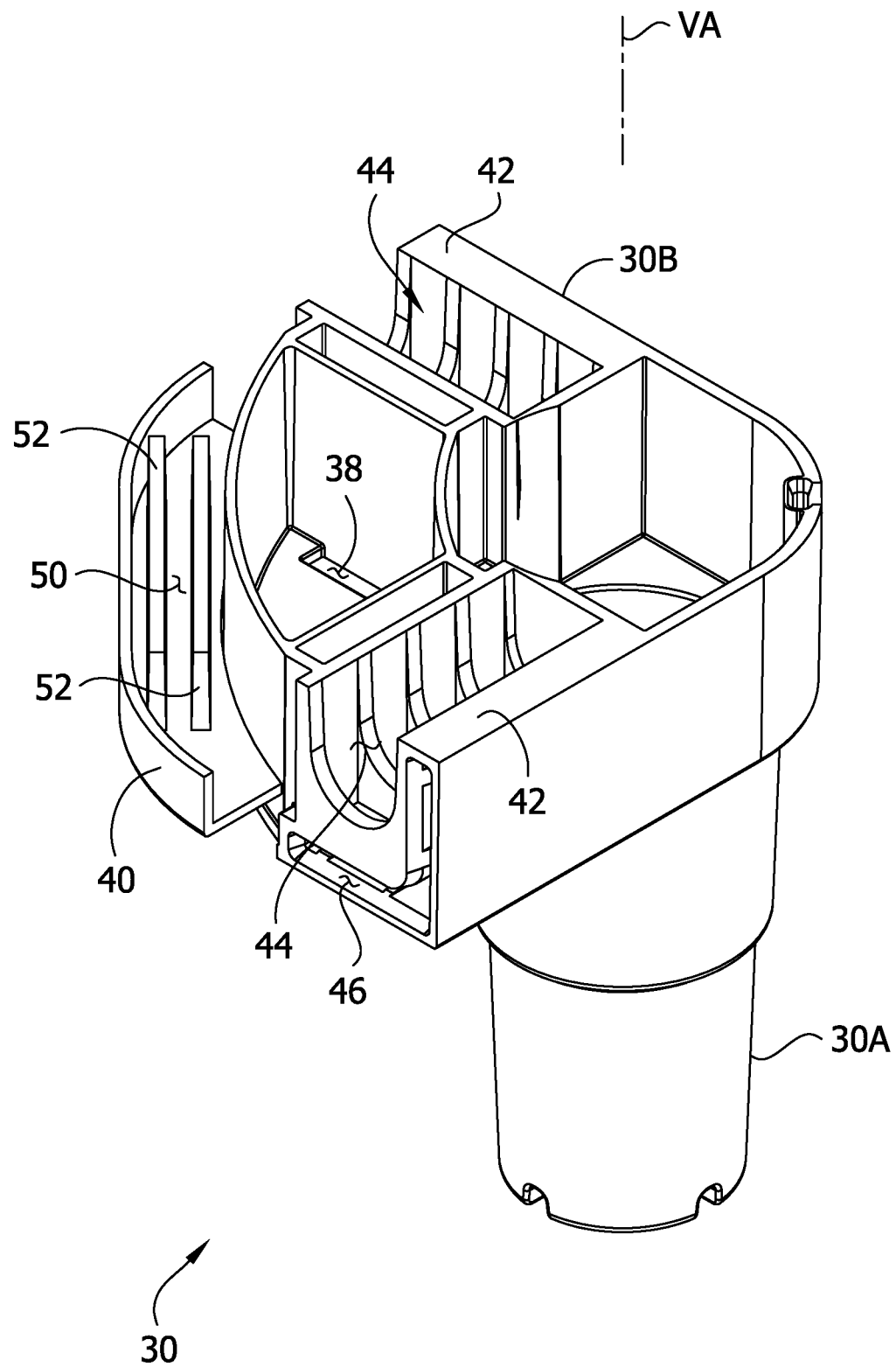
FIG. 5 is a perspective of a base member of a corner connector of the cot.
Figure 6:
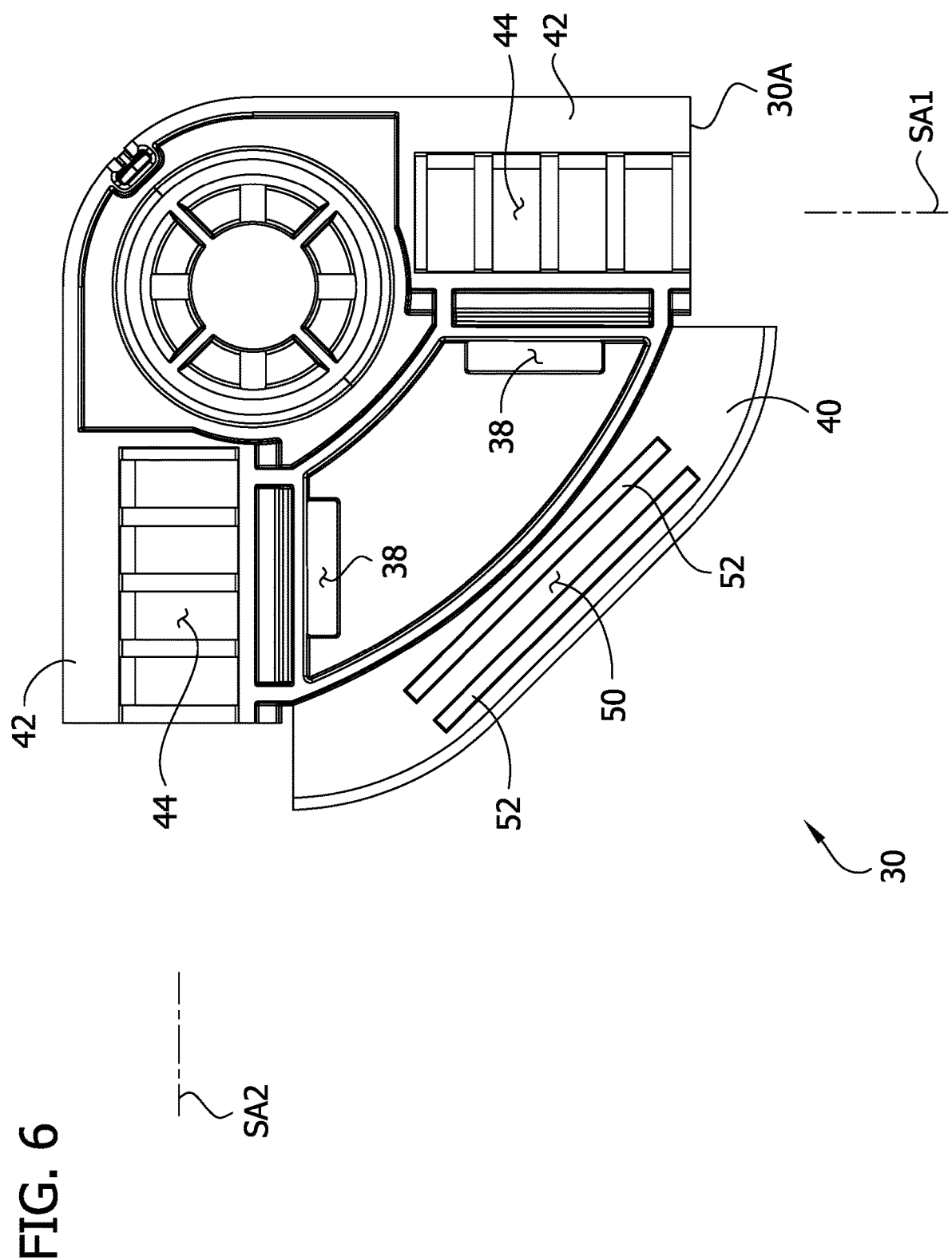
FIG. 6 is a top plan view of the base member.

Referring to FIGS. 5 and 6, the upper attachment portion 30B extends from the top end of the leg portion 30A, generally in the support plane of the cot 10, and defines a top of the base member 30. The attachment portion 30B defines two locking openings 38 extending through the attachment portion along the vertical axis VA to facilitate interlocking engagement between the base member 30 and the cap 32 as described below. The attachment portion 30B of the base member 30 is configured to receive a respective corner margin 14A of the support sheet 14 and respective end portions of two each of the side frame members 22 and the side shield members 24. The attachment portion 30B comprises an inner sheet attachment section 40 and first and second frame attachment sections 42, which extend along the outer perimeter of the base member 30. In the illustrated embodiment, the leg 30A projects downwardly along the vertical axis VA from a location generally between the first and second frame attachment sections 42. Each of the first and second frame attachment sections 42 extends away from the leg 30A, generally along a respective side axis SA1, SA2 (FIG. 6).

Referring still to FIGS. 5 and 6, each frame attachment section 42 forms a receiver for receiving a respective end portion of one of the frame members 22 and a respective end portion of one of the shield members 24. More specifically, each frame attachment section 42 defines a frame member channel 44 and a shield member socket 46 (each, broadly, a recess). Each frame member channel 44 extends along a respective one of the side axes SA1, SA2 (FIG. 6) and has an open top end extending through the top of the base member 30 along the respective side axis. The frame member channel 44 is sized is sized and arranged for receiving an end portion of the respective side frame member 22 of the frame assembly 12. Referring to FIG. 3, the illustrated frame member channel 44 has a substantially U-shaped perimeter for receiving a side frame member 22 having a substantially cylindrical exterior surface. Other embodiments of frame members and frame member channels can have other shapes. As explained in further detail below, the open top ends of the frame member channels 44 simplify assembly of the cot 10 by allowing each of the side frame members 22 to be inserted into the loops defined by the side margins 14B of the support sheet 14 before being installed in the corner connectors 20.

Each shield member socket 46 extends along a respective one of the side axes SA1, SA2, and the attachment portion 30B of the base member 30 extends circumferentially around the entire perimeter of the socket along the respective side axis such that the socket has a fully enclosed perimeter about the axis. The shield member socket 46 is sized and arranged for receiving an end portion of the respective shield member 24 of the frame assembly 12. Referring to FIG. 3, the illustrated shield member socket 46 has a substantially L-shaped cross-sectional shape for receiving an L-shaped shield member 24. Specifically, each shield member 24 has a horizontal portion 24A defining a bottom of the shield member and a vertical portion 24B extending vertically from the horizontal portion to a top end. In one more embodiments, the shield member socket 46 is sized and arranged so that the base member 30 engages the shield member 24 received in the socket with a strong friction fit to inhibit the shield member from becoming separated from the base member when a force is imparted on the shield member in a direction away from the base member along the respective side axis SA1, SA1. In other embodiments, the shield member could be fastened to the corner connector in other ways.

As shown in FIG. 3, the frame member channel 44 and the shield member socket 46 are arranged to position the frame member 22 and the shield member 24 so that the horizontal portion 24B of the shield member extends beneath and adjacent the frame member and the vertical portion 24B of the shield member extends alongside and immediately adjacent the frame member. Thus, when the cot 10 is assembled, each shield member 24 blocks access to a frame member 22 and likewise blocks access to a portion of the looped side margin 14B of the support sheet 14 extending around the frame member. By providing limited access to the looped side margin 14B of the support sheet 14, the shield members 24 protect the support sheet from damage caused, for example, by an animal or child chewing or scratching at the edges of the cot 10 or other forms of edge wear. Although the illustrated embodiment uses L-shaped shield members 24 and sockets 46, other embodiments can use other cross-sectional shapes (e.g., curved cross-sectional shapes, J-shaped cross-sectional shapes, U-shaped cross-sectional shapes, etc.) to protect the edges of the support sheet from damage. Suitably, however, the shield members can be shaped and arranged to extend beneath and alongside the adjacent side frame member without extending above the frame member when installed to allow the frame members to be lowered into the frame member channels along the vertical axis after the shield members have been installed in the shield member sockets.

Figure 4:
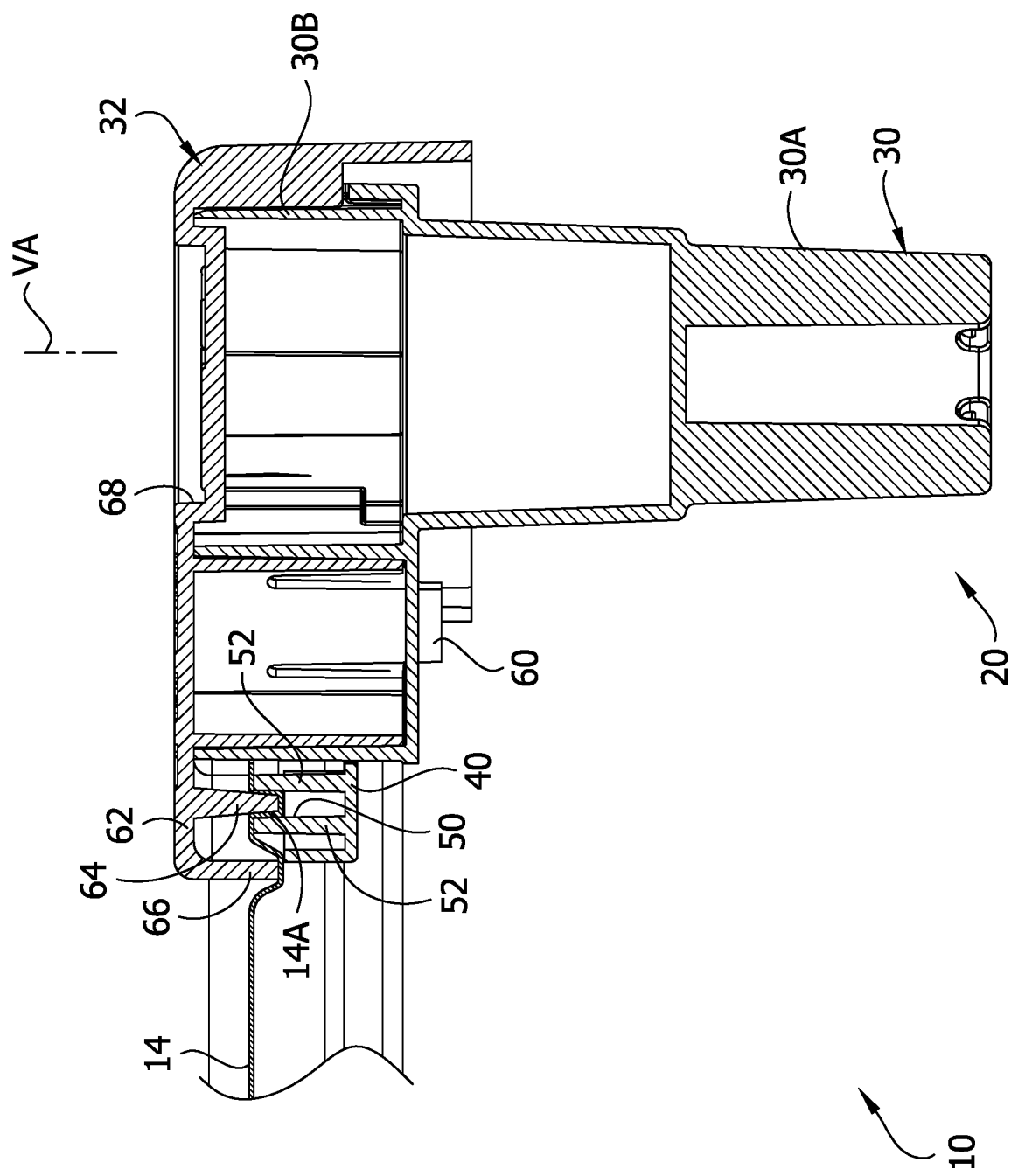
FIG. 4 is a fragmentary cross section taken in the plane of line 4-4 of FIG. 1.

Referring to FIGS. 4-6, the sheet attachment section 40 is shaped and arranged to be positioned beneath a respective corner margin 14A of the support sheet and configured to capture the corner margin between the base member 30 and the cap 32 of the corner connector 20 when the cot 10 is assembled. The sheet attachment section 40 defines a groove 50 that has an open top end. More specifically, the sheet attachment section 40 comprises first and second elongate tabs 52 that extend upward along the vertical axis VA and define inboard and outboard boundaries of the groove 50. As explained below, the groove 50 is sized and arranged for receiving a portion of the respective corner margin 14A of the support sheet 14 that is pushed into the groove by the cap 32 whereby the corner margin is captured between the cap and the base member 30.

Figure 7:
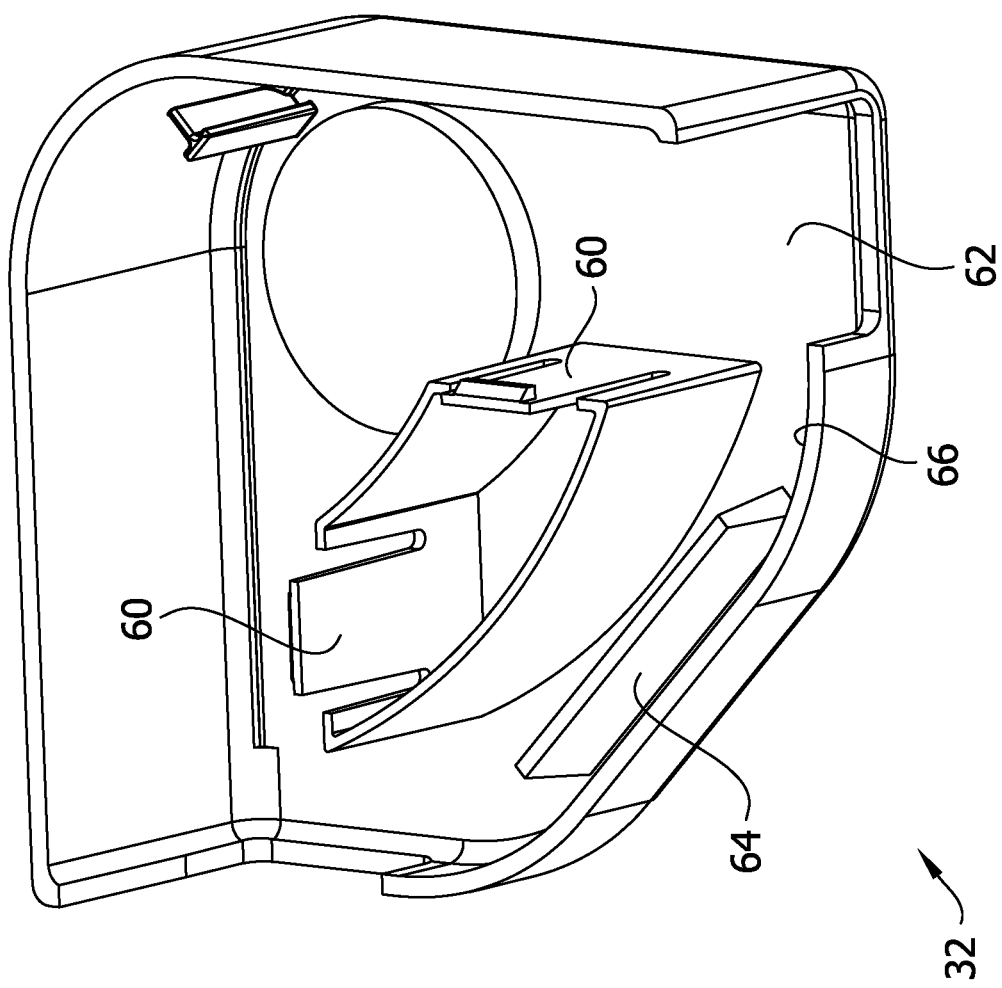
FIG. 7 is a bottom perspective of a cap of the corner connector.

Referring to FIGS. 3, 4, and 7, the cap 32 is configured to be lockingly engaged with the base member 30 to from the top of the corner connector 20. The cap 32 includes first and second locking tabs 60 extending generally along the vertical axis VA, which are shaped and arranged for being lockingly received in the locking openings 38 when the cap is pressed onto the base member 30. Each locking tab 60 includes a catch portion that is received beneath the bottom side of the attachment portion 30B of the base member 30 when the tabs are received in the holes 38 to lock the cap 32 onto the base member. The cap 32 also includes a top wall 62 that extends over the open top ends of the frame member channels 44 when the cap is attached to the base member 30. The cap 32 thus encloses the end portions of the frame members 22 in the frame member channels 44 when installed on the base member 30. The top surface of the top wall 62 defines a recess 68 that is sized and arranged for receiving the bottom end segment of a leg portion 30A of another corner connector 20 to align cots 10 of the same size for being stacked vertically atop one another when not in use.

A tongue 64 extends downward from the top wall 62 adjacent an inner margin thereof. The tongue 64 is sized and arranged for being received in the groove 50 of the sheet attachment section 40 when the cap 32 is attached to the base member 30. The tongue 64 is configured to press a portion of the respective corner margin 14A of the support sheet 14 into the groove 50 to capture the corner margin between the base member 30 and the cap 32. More specifically, as shown in FIG. 4, the corner margin 14A is captured between the tongue 64 and the first and second tabs 52. The corner connector 20 thereby holds each corner margin 14A of the support sheet 14 in place to maintain tension across the support sheet and inhibit a user's extremities from becoming trapped between the support sheet and the corner connector.

The cap 32 also includes an overhang lip 66 that extends downward from the inner margin of the top wall 62. As shown in FIG. 4, the overhang lip 66 projects downward from the top wall 62 a sufficient distance to force the respective corner margin 14A of the support sheet downward before it extends over the innermost tab 52. Moreover, in one embodiment, the overhang lip 66 is located inboard of substantially the entire edge of the corner margin 14A. The cap 32 is thus sized and arranged to block access to (e.g., shield) the corner margin 14A of the support sheet 12 when the cot 10 is assembled.

An exemplary method of assembling and using the cot 10 will now be briefly described. Referring to FIG. 2, to assemble the frame assembly 12, each end portion of a shield member 24 is inserted into the respective shield member socket 46 of a corner connector base member 30 to form a first subassembly of the desired shape, in this case rectangular. In addition, the side frame members 22 are inserted into the looped side margins 14B of the support sheet 14 to form a second subassembly. The second subassembly is installed as a unit into the first subassembly by substantially simultaneously lowering (broadly, inserting) the end portions of the side frame members 22 (which are concurrently received in the looped margins 14B of the support sheets 14) along the vertical axis VA into the frame member channels 44 of the base members 30 (which are concurrently attached to the shield members 24). Inserting the end portions of the side frame members 22 into the channels 44 imparts tension along both axes SA1, SA2 to the support sheet 14. As a result, the support sheet 14 is pulled taught, and the corner margins 14A are positioned over the grooves 55 in the sheet attachment sections 40 of the corner connector base members 30. A cap 32 is installed on each of the base members 30 by inserting the locking tabs 60 into the corresponding locking openings 38. When the cap 32 is locked in place, the overhang lip 66 presses down on the corner margin 14A of the support sheet inboard of the outer edge and the tongue 64 presses a portion of the corner margin into the groove 50 to capture the corner margin between the tongue and the tabs 52.

In use, the frame assembly 12 holds the support sheet 14 at a position spaced apart above the underlying support surface. A user, such as a pet or a person, can rest comfortably on the cot 10, spaced apart above the underlying support surface. The side frame members 22 received in the corner connectors 20 maintain tension on the support sheet along both axes SA1, SA2. The shield members 24 block access to the side margins 14B of the support sheet 14 to limit wear or damage caused by, for example, chewing on the edges of the cot 10. Likewise the base member 30 and the cap 32 maintain engagement with the corner margins 14A to shield the corner margins and maintain tension on the support sheet 14 at the corner margins. When several cots 10 are not in use, they can be stacked without disassembly so that the legs 30A are received in the recesses 68 formed in the tops of the caps 32. If disassembly is desired (e.g., to replace the support sheet 14), the caps 32 can be separated from the base members 30 by disconnecting the tabs 60 from the holes 38. Subsequently, the side frame members 22 can be removed from the channels 44 and the looped side margins 14B of the support sheet 14. The cot 10 can then be reassembled (e.g., with a replacement support sheet) as described above.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above apparatuses, systems, and methods without departing from the scope of the invention, it is intended that all matter contained in the above description and shown in the accompanying drawings shall be interpreted as illustrative and not in a limiting sense.

What is claimed is:

1. A corner connector for use in a frame assembly of a cot, the corner connector comprising:
   a base member having an attachment portion defining a top of the base member and a support portion defining a bottom of the base member spaced apart from the top of the base member along an axis, the attachment portion comprising a first frame member attachment section and a second frame member attachment section, the first frame member attachment section defining a first frame member channel for receiving an end portion of a side frame member of the frame assembly, the first frame member channel having an open top end extending through the top of the base member, the second frame member attachment section defining a second frame member channel for receiving an end portion of another side frame member of the frame assembly, the second frame member channel having an open top end extending through the top of the base member and extending transverse to the first frame member channel; and
   a cap securable to the base member to extend over the open top ends of the first and second frame member channels;
   wherein the first frame member attachment section defines a first shield member recess adjacent and outboard of the first frame member channel and the second frame member attachment section defines a second shield member recess adjacent and outboard of the second frame member channel, wherein the first and second shield member recesses are configured to receive first and second shield members therein and to position the first and second shield members to extend along outboard sides of the first and second side frame members received in the first and second frame member channels, respectively.

2. A corner connector as set forth in claim 1, wherein each of the first and second frame member channels has a respective first end, a respective second end, and a respective length extending from the respective first end to the respective second end.

3. A corner connector as set forth in claim 2, wherein the first end of each of the first and second frame member channels is open and the second end of the first and second frame member channels is closed.

4. A corner connector as set forth in claim 2, wherein the top end of each of the first and second frame member channels is open along a majority of the length of the respective one of the first and second frame member channels.

5. A corner connector as set forth in claim 1, wherein the base member comprises a sheet attachment section and the cap comprises a portion configured to oppose the sheet attachment section of the base member for capturing a corner margin of a support sheet of the cot between the sheet attachment section and the cap.

6. A corner connector as set forth in claim 1, wherein each of the first and second shield member recesses has a closed top end.

7. A frame assembly for a cot comprising a plurality of corner connectors as set forth in claim 1 and a plurality of side frame members having end portions configured for being inserted into the first and second frame member channels through the open top ends of the frame member channels of the base members of said plurality of corner connectors.

8. A cot comprising the frame assembly set forth in claim 7 and a support sheet having a plurality of side margins securable to the plurality of side frame members.

9. A corner connector for use in a frame assembly of a cot, the corner connector comprising a body comprising a first frame member attachment section and a second frame member attachment section, each of the first and second frame member attachment sections defining a frame member recess configured to operatively receive a respective side frame member of the frame assembly and a shield member recess adjacent and outboard of the frame member recess configured to operatively receive a respective shield member of the frame assembly, wherein the cot is configured to be formed by a support sheet looped around each side frame member, the frame member recess and the shield member recess of each of the first and second frame member attachment sections being shaped and arranged to mount the respective side frame member and the respective shield member on the corner connector so that the shield member extends alongside an outboard edge of the side frame member immediately adjacent thereto when the frame member recess and the shield member recess operatively receive the respective side frame member and shield member.

10. A corner connector as set forth in claim 9, wherein each of the shield member recesses has a side portion that extends alongside an outboard side of the respective one of the frame member recesses and a bottom portion that extends along a bottom side of the respective one of the frame member recesses.

11. A corner connector as set forth in claim 9, wherein each of the shield member recesses has a top end that is spaced apart laterally outboard of the respective one of the frame member recesses.

12. A corner connector as set forth in claim 9, wherein each of the shield member recesses is generally L-shaped.

13. A frame assembly for a cot comprising a plurality of corner connectors as set forth in claim 9 and a plurality of side frame members and shield members for being operatively received in the frame member recesses and the shield member recesses of said plurality of corner connectors to form perimeter sides of the frame assembly.

14. A cot comprising the frame assembly set forth in claim 13 and a support sheet having a plurality of side margins securable to the plurality of side frame members, wherein the shield members are configured to block access to portions of said side margins when the side margins are secured to the side frame members in the assembled frame assembly.

15. A corner connector for use in a frame assembly of a cot, the corner connector comprising:
   a base member having an attachment portion defining a top of the base member and a support portion defining a bottom of the base member spaced apart from the top of the base member along an axis, the attachment portion being configured for attachment to first and second side frame members of the frame assembly whereby the corner connector mounts the first and second side frame members for extending from the corner connector in transverse directions, the base member further comprising a sheet attachment section; and a cap securable to the base member and including an opposing sheet attachment portion configured to oppose the sheet attachment section of the base member for capturing a corner margin of a support sheet of the cot between the sheet attachment section and the cap;

wherein the sheet attachment section and the opposing sheet attachment portion are configured to bend the corner margin of the support sheet to undulate up and down between the base member and the cap.

16. A corner connector as set forth in claim 15, wherein one of the sheet attachment section and the opposing sheet attachment portion comprises a groove located between the first and second frame member channels and the other of the sheet attachment section and the opposing sheet attachment portion comprises a tongue that is configured to be received in the groove when the cap is secured to the base member.

17. A corner connector as set forth in claim 16, wherein the opposing sheet attachment portion comprises an overhang lip that extends downward and defines an inner end of the opposing sheet attachment portion, wherein the overhang lip extends downward a sufficient distance to bend the corner margin of the support sheet downward when the cap is secured to the base member.

18. A frame assembly for a cot comprising a plurality of corner connectors as set forth in claim 16 and a plurality of side frame members configured for being attached to said plurality of corner connectors.

19. A cot comprising the frame assembly set forth in claim 18 and said support sheet wherein the support sheet has a plurality of corner margins and a plurality of side margins extending between the corner margins, the side margins being securable to the plurality of side frame members and the support sheet being shaped and arranged such that the corner margins are captured between the sheet attachment sections of the base portions and the opposing sheet attachment portions of the caps of said plurality of corner connectors when the cot is assembled.

20. A corner connector for use in a frame assembly of a cot, the corner connector comprising:

a base member having an attachment portion defining a top of the base member and a support portion defining a bottom of the base member spaced apart from the top of the base member along an axis, the attachment portion comprising a first frame member attachment section and a second frame member attachment section, the first frame member attachment section defining a first frame member channel for receiving an end portion of a side frame member of the frame assembly, the first frame member channel having an open top end extending through the top of the base member, the second frame member attachment section defining a second frame member channel for receiving an end portion of another side frame member of the frame assembly, the second frame member channel having an open top end extending through the top of the base member and extending transverse to the first frame member channel; and a cap securable to the base member to extend over the open top ends of the first and second frame member channels, wherein the base member and the cap comprise mutual locking elements that are configured to secure the cap to the base member by snap fit connection; and wherein the first frame member attachment section defines a first shield member recess adjacent and outboard of the first frame member channel and the second frame member attachment section defines a second shield member recess adjacent and outboard of the second frame member channel, wherein the first and second shield member recesses are configured to receive first and second shield members therein and to position the first and second shield members to extend along outboard sides of the first and second side frame members received in the first and second frame member channels, respectively.

* * * * *